Figure 1:
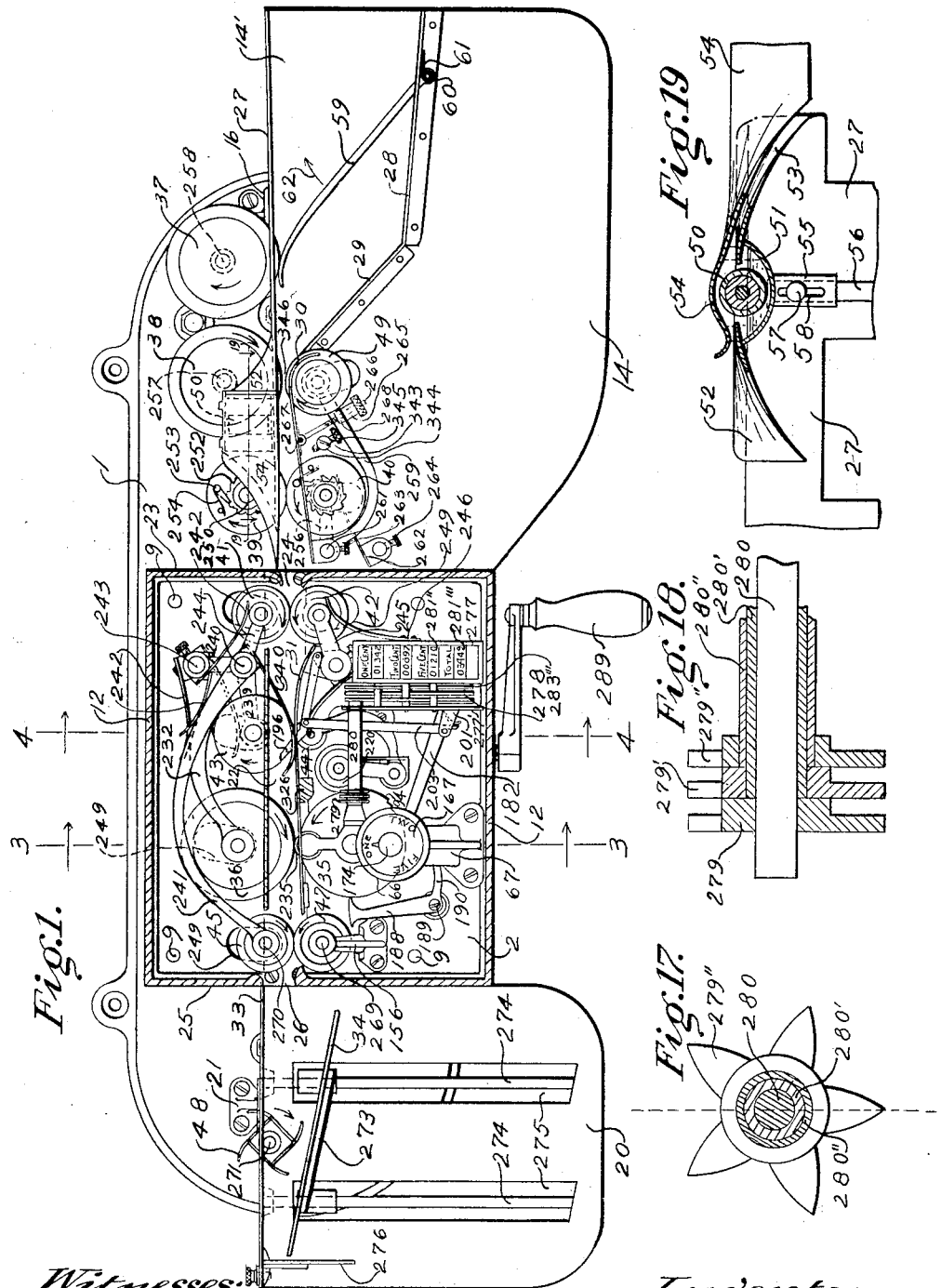

No. 753,207. PATENTED FEB. 23, 1904.
A. H. PITNEY.
MAIL MARKING MACHINE.
APPLICATION FILED AUG. 8, 1902.
NO MODEL. 7 SHEETS—SHEET 1.

Witnesses:
Rudow Rummler
Blanche Michael

Inventor,
Arthur H. Pitney
By Rummler & Rummler
his Attorneys.

No. 753,207. PATENTED FEB. 23, 1904.
A. H. PITNEY.
MAIL MARKING MACHINE.
APPLICATION FILED AUG. 8, 1902.
NO MODEL. 7 SHEETS—SHEET 3.

Witnesses: Inventor,

No. 753,207. PATENTED FEB. 23, 1904.
A. H. PITNEY.
MAIL MARKING MACHINE.
APPLICATION FILED AUG. 8, 1902.
NO MODEL. 7 SHEETS—SHEET 4.
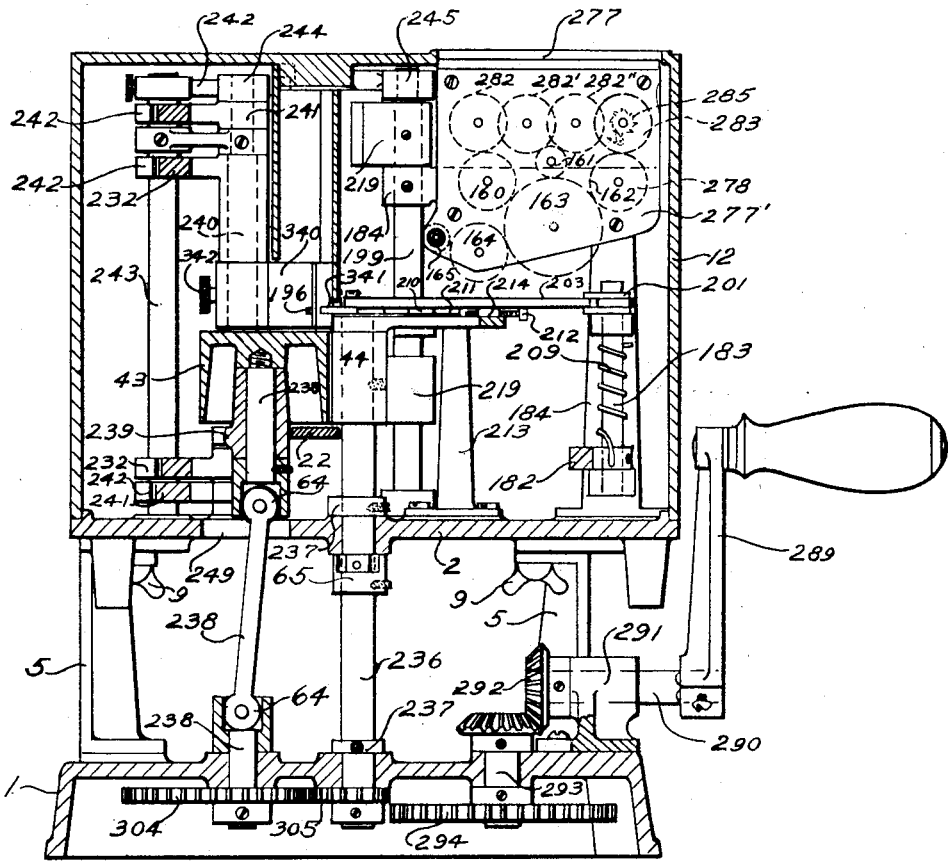

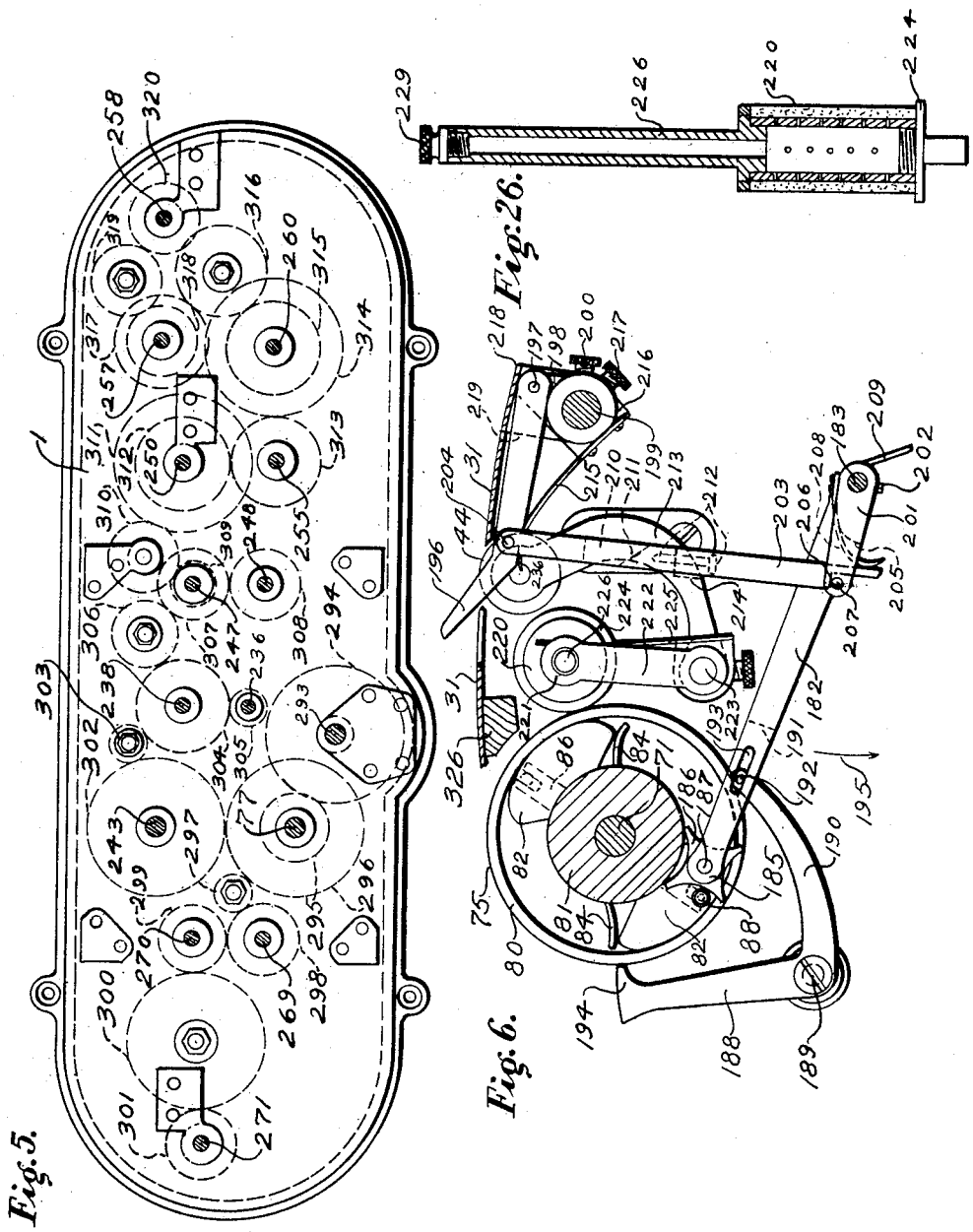

No. 753,207. PATENTED FEB. 23, 1904.
A. H. PITNEY.
MAIL MARKING MACHINE.
APPLICATION FILED AUG. 8, 1902.
NO MODEL.
7 SHEETS—SHEET 6.
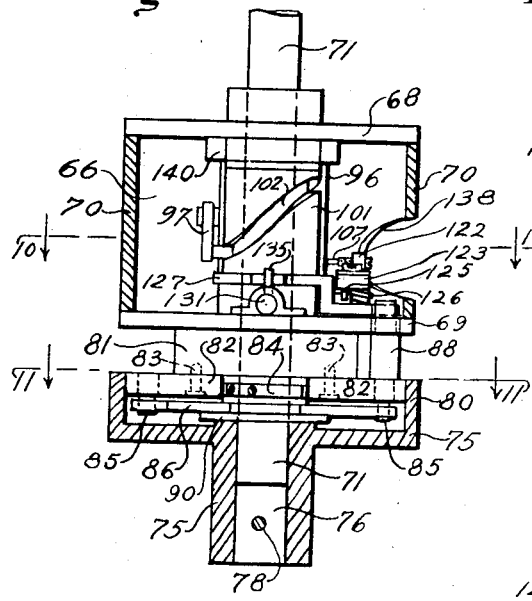
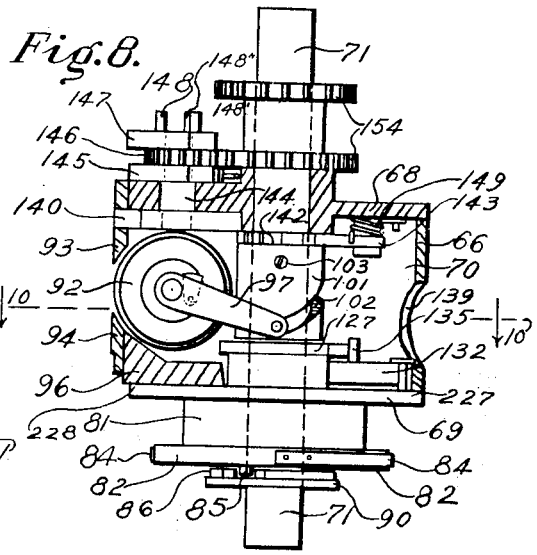
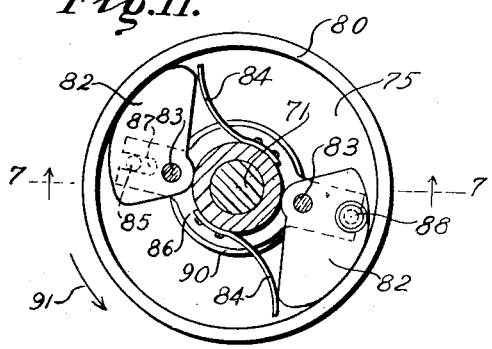
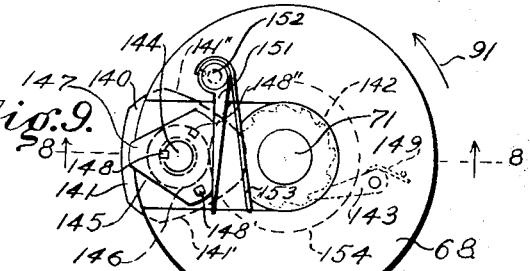
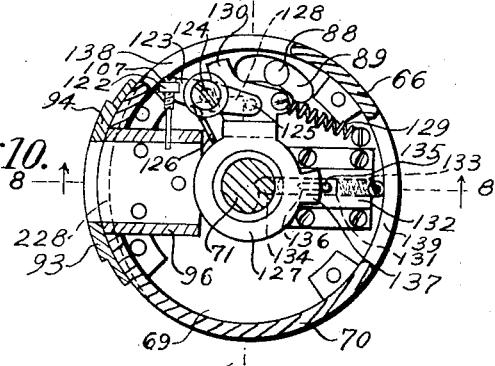
Witnesses:
Rudow Rummler
Blanche Michael
Inventor,
Arthur H. Pitney
by Rummler & Rummler
his Attorneys.

No. 753,207. PATENTED FEB. 23, 1904.
A. H. PITNEY.
MAIL MARKING MACHINE.
APPLICATION FILED AUG. 8, 1902.
NO MODEL. 7 SHEETS—SHEET 7.
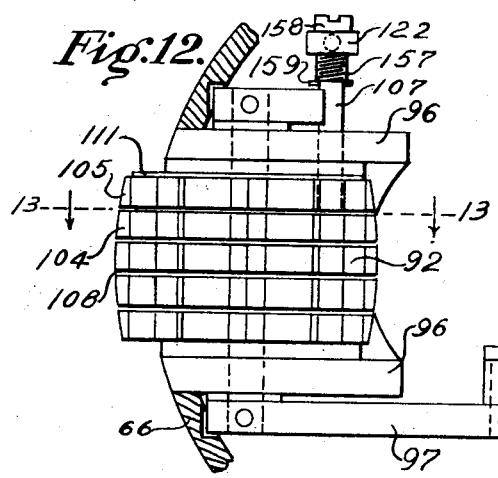
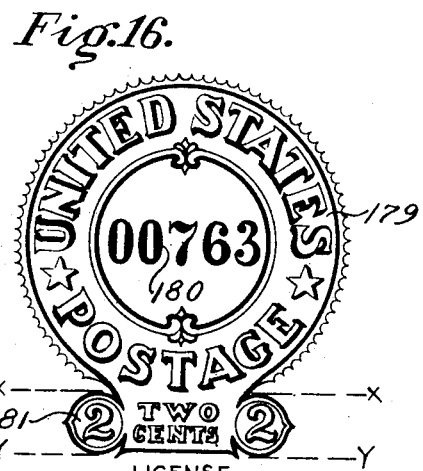
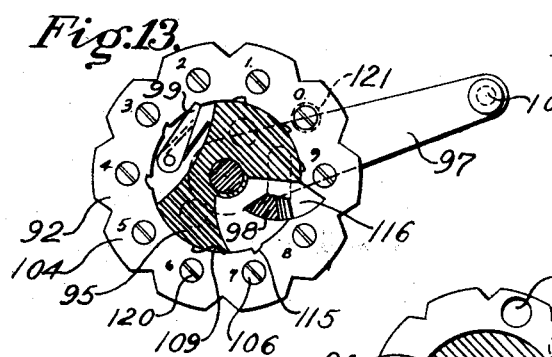
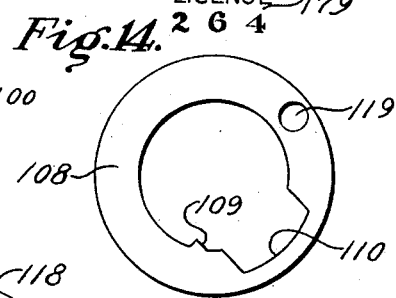
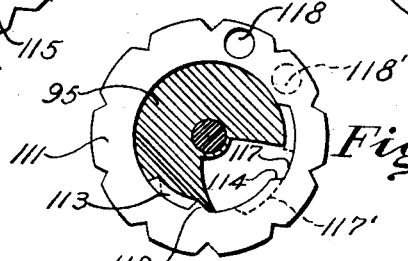
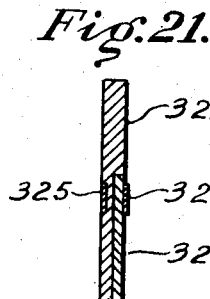
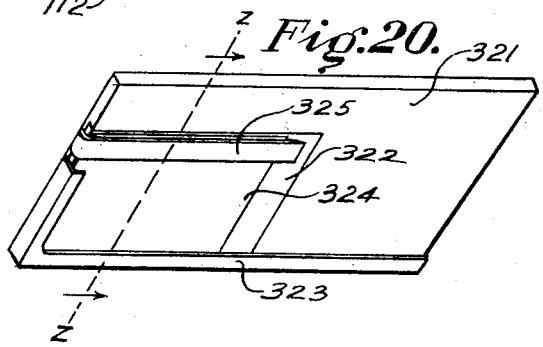

No. 753,207.

Patented February 23, 1904.

UNITED STATES PATENT OFFICE.

ARTHUR H. PITNEY, OF CHICAGO, ILLINOIS.

MAIL-MARKING MACHINE.

SPECIFICATION forming part of Letters Patent No. 753,207, dated February 23, 1904.

Application filed August 8, 1902. Serial No. 118,937. (No model.)

*To all whom it may concern:*

Be it known that I, ARTHUR H. PITNEY, a citizen of the United States of America, and a resident of Chicago, in the county of Cook and State of Illinois, have invented certain new and useful Improvements in Mail-Marking Machines, of which the following is a specification.

The main objects of my invention are to provide an improved machine for printing or impressing stamps upon envelops, cards, or stickers, consecutively numbering such impressions, and automatically locking itself against further operation when a certain predetermined number of impressions have been made, to construct said machine in such manner that envelops fed to same will be sealed, stamped, and stacked in regular order, to provide such construction for said machine that same shall be capable of performing the said operations continuously and rapidly, to provide improved means for adjusting said machine for the purpose of changing the number of impressions which same will make before being automatically stopped, to provide means for changing the denomination of the stamps or otherwise varying the form of the impressions made by said machine, to provide suitable mechanism for registering the number of impressions of each denomination and the total number of impressions made by said machine, to provide suitable protection for the numbering, registering, and locking mechanisms in order to prevent access to same by unauthorized parties, and to provide suitable construction which will permit the numbering, printing, registering, and locking mechanisms to be removed from the remaining parts of the machine without rendering said mechanisms accessible to unauthorized parties. I accomplish these objects by the device shown in the accompanying drawings, in which—

Figure 2:
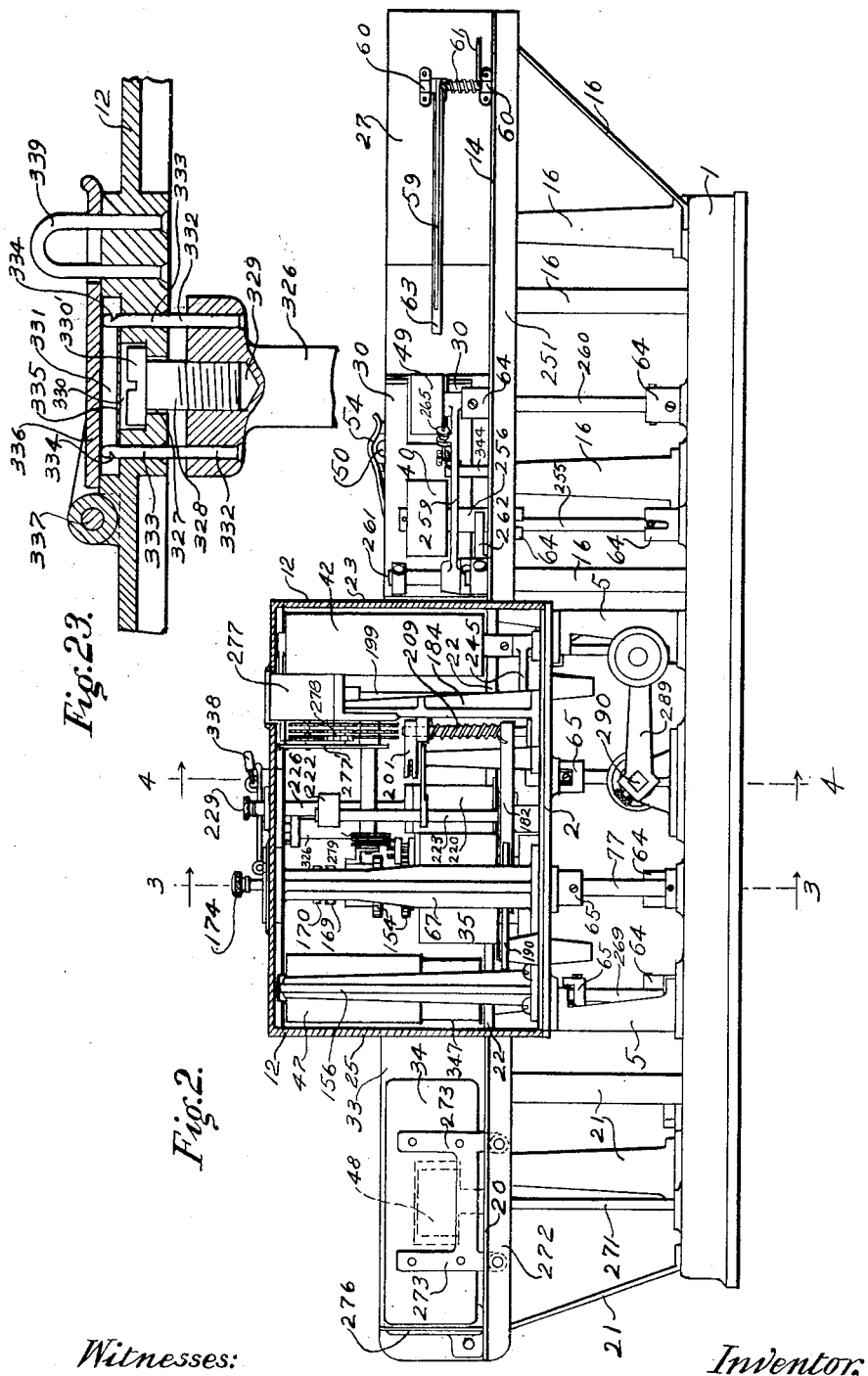
Figure 3:
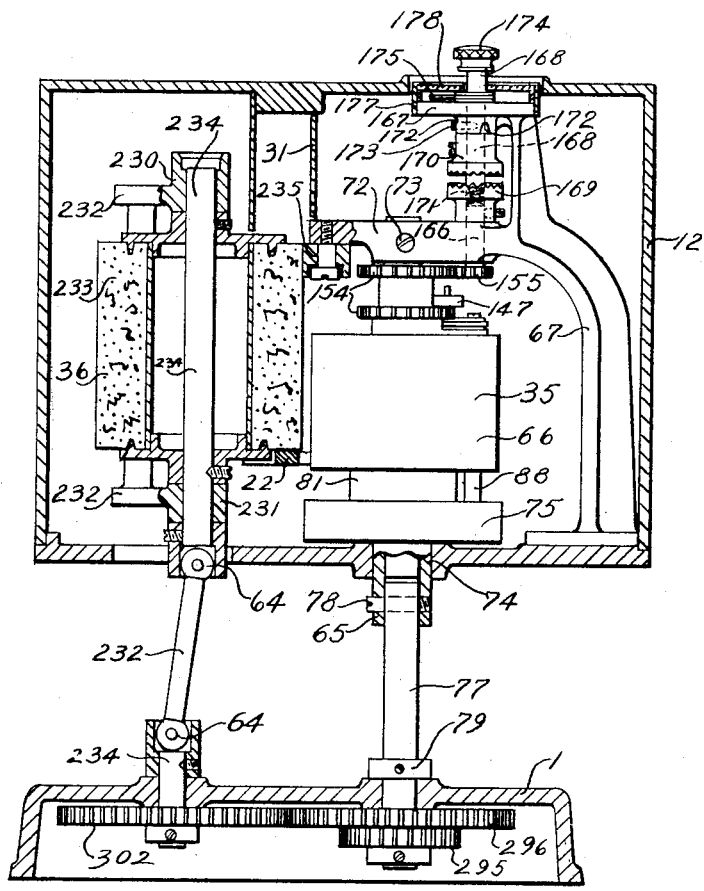
Figure 22:

Figure 1 is a top plan of a device constructed according to my invention, part of the protecting-casing being removed to disclose the mechanism contained therein. Fig. 2 is a side elevation of the same, the casing being broken away. Fig. 3 is a section on the line 3 3 of Figs. 1 and 2, the parts of the machine back of the plane of section being omitted for the sake of clearness. Fig. 4 is a section on the line 4 4 of Fig. 1, some parts in the background being again omitted. Fig. 5 is a top plan of the bed-plate, the gearing within said bed-plate being indicated by dotted lines and the upper parts of the machine being removed. Fig. 6 is an enlarged plan, partly in section, of the trip mechanism for controlling the operation of the printing-roller. Figs. 7 and 8 are side elevations of the printing-roller, the shell of said roller being partly broken away to disclose the interior mechanism. Fig. 9 is a top plan of the same, the gear 154 being indicated by dotted lines and the plate 94 being removed. Fig. 10 is a section of the printing-roller along the line 10 10. Fig. 11 is a section of the same along the line 11 11. Fig. 12 is a top plan view of the numbering mechanism. Fig. 13 is a section of the same along the line 13 13. Fig. 14 is an elevation of one of the washers which are used for separating the numbering-wheels. Fig. 15 is a plan view of a specially-constructed washer which takes the place of an extra wheel in the series of numbering-wheels. Fig. 16 is an enlarged representation of the type of stamp for the printing of which the device shown is particularly constructed. Fig. 17 is a section of the register-shaft, showing the star for operating the registers. Fig. 18 is a section on the line 18 18 of Fig. 17, showing the three register-stars and their concentric shafts. Fig. 19 is a section of the sealing mechanism on the line 19 19 of Fig. 1. Fig. 20 is a perspective view of the shuttle which is adapted to carry through the machine a sticker or other thin sheet of paper upon which it is desired to print an impression. Fig. 21 is a section of the same on the line Z Z of Fig. 20. Fig. 22 is a top plan of the indicator-pointer. Fig. 23 is a section of the locking means for securing the casing 12 to the bed-plate 2. Fig. 24 is an end elevation, and Fig. 25 is a side elevation, of the gears 283, showing the means of connecting same to the shaft 284. Fig. 26 is a vertical section of the ink-roller.

The device shown consists of a trough for receiving envelops, suitable means for feeding said envelops singly and in succession to the succeeding mechanisms, means for sealing said envelops, mechanism for printing a stamp upon each of said envelops, mechanism for regulating the denomination and total number of each denomination of stamp printed, mechanism for automatically locking said printing mechanism against further operation when a certain number of impressions have been made by same, and mechanism for stacking the envelops in regular order at the delivery end of said machine after said envelops have been sealed and stamped.

In the construction shown the bed-plate 1 is hollow and forms a casing for the system of driving-gears. A second bed-plate 2 is supported in a horizontal position and above the bed-plate 1 by means of the four vertical standards 5. The bed-plate 2 is secured to the standards 5 by means of thumb-screws 9, so as to be readily removable from said standards. A casing 12, together with the bed-plate 2, forms a receptacle within which all of the mechanism which is to be inaccessible to the user is contained.

The receiving-platform 14 is rigidly secured to the bed-plate 1 by means of the standards 16. The delivery-platform 20 is similarly secured to the bed-plate 1 by means of standards 21. The receiving and delivery platforms are not connected with the casing 12, except by means of the vertical standards 5 and 21 and the bed-plate 1. The horizontal plate 22 extends through the interior of the casing 12 in the plane of the platforms 14 and 20 and forming a continuation of said platforms. The forward side 23 of the casing 12 is provided with a vertically-disposed slot 24, which serves as an inlet for mail-matter into the casing 12, and the rear end 25 of the casing 12 is provided with a similar slot 26, which serves as an outlet for mail-matter delivered from the mechanism within said casing. The vertical walls 27, 28, and 29, which are secured to the platform 14, form a trough 14', within which a plurality of envelops may be placed on edge preparatory to being fed through the casing 12. The spring 30, the walls 31 and 32 within the casing 12, the wall 33 on the platform 20, and the movable plate 34 serve as limiting-guides to the lateral movement of mail-matter passing through the machine. The printing-roller 35 is journaled on a vertical axis in fixed bearings within the casing 12 and has a coacting platen-roller 36, journaled on movable bearings within the casing 12. Mail-matter is delivered to the printing-roller 35 by the system of feed-rollers 37, 38, 39, 40, 41, 42, 43, and 44 and is carried away from the printing-roller 35 by means of the delivery-rollers 45, 46, and 47. The stacker 48 forces the mail-matter laterally against the moving plate 34 and provides a passage through which the next succeeding piece of mail-matter may enter.

The separator-roller 49 revolves in the same direction as the adjacent feed-roller 38. Their adjacent surfaces therefore move in opposite directions and serve to prevent more than one envelop at a time from entering the slot 24.

Sealing of the envelops is accomplished by causing the flaps of the envelops to pass over a moistened roller 50. The roller 50 is journaled within a receptacle 51, so as to dip below the surface of liquid contained in said receptacle. The receptacle 51 is arranged so as to be adjustable vertically above the platform 14 in order that envelops of different widths may be sealed by the apparatus. The receptacle 51 has secured thereto and adjustable therewith the guide-plates 52, 53, and 54, which serve to guide the flaps of envelops into contact with the roller 50 and afterward turn said flaps against the main part of the envelop before the arrival of said envelop at the feed-rollers 41 and 42, where the sealing is completed. The receptacle 51 is provided with a channel-shaped arm 55, which is adapted to slide along the guide 56 on the plate 27. A screw 57 passes through the slot 58. The screw 57 is threaded in the guide 56 and serves as a clamp for adjustably securing the receptacle 51 in position.

A finger 59, pivoted at 60 to the wall 28, is normally urged by means of the spring 61 in the direction of the arrow 62 and serves to hold the envelops in the trough 14' against the feed-roller 37. The walls 28 and 29 are provided with a suitable slot 63, through which the finger 59 may be turned.

The platen-roller 36, the feed-rollers 37, 38, 41, and 42, the delivery-rollers 45 and 47, and the separator-roller 49 are preferably covered with rubber, as indicated in the drawings, in order to insure a firm grip upon the mail-matter passing between same. For the purpose of affording automatic adjustment for envelops of varying thickness one or both of the members of each pair of feed-rollers is mounted in swinging bearings. In the present instance the rollers 49, 39, 40, 41, 42, 43, 36, and 45 are so mounted. These movable rollers are normally urged toward their mates by means of springs. The driving-shafts of the movable rollers are provided with suitable universal joints 64, so that power may be supplied by gearing. The rollers which are journaled in fixed bearings within the casing 12 have their driving-shafts provided with joints 65, which are readily separable to permit the removal of the casing 12 and its contained mechanism from the remaining part of the machine. The printing-roller 35 consists of a cylindrical printing member 66, journaled on a vertical axis in fixed bearings in the plate 2 and in the bracket 67. The printing member 66 consists of an upper flange 68 and a lower flange 69, connected by a cylindrical shell 70. The flanges 68 and 69 are loosely journaled on a shaft 71, which is rigidly secured to the arm 72 of the bracket 67 by means of a set-screw 73. Journaled at 74 in the bed-plate 2 and concentrically with the printing member 66 is the clutch-flange 75.

The lower end of the shaft 71 is seated in a central aperture 76 in the clutch-flange 75. Rotation is imparted to the flange 75 by means of a driving-shaft 77, which is secured to the flange 75 by means of a pin 78. The shaft 77 also enters the aperture 76 in exact alinement with the shaft 71. The pin 78 is preferably seated in a slot in the upper end of the shaft 77, so that the flange 75 may be disconnected from the shaft 77 by being drawn upward, as is the case when the casing 12 and its inclosed mechanism are removed from the remaining parts of the machine. The shaft 77 is also journaled in the bed-plate 1 and is prevented from slipping downward by means of a collar 79. The flange 75 is provided with an upwardly-extending rim 80. The lower part of the head 69 of the printing member 66 forms a cylindrical drum 81, which is of considerably less diameter than the periphery of the shell 70. A pair of cams 82 are pivoted at 83 to the lower end of the drum 81 and are normally held in contact with the inner surface of the rim 80 by means of the springs 84. Each of the cams 82 is provided with a downwardly-projecting pin 85. A lever 86 serves to connect the cams 82 in such manner that when one of said cams is turned to its pivot 83 the other cam will be caused to make exactly the same movement. One of the cams 82 has a pin 88 projecting upward therefrom and at the side of the drum 81 and entering the slot 89 in the lower end of the printing member. A washer 90 separates the lever 86 from the clutch-flange 75. The normal direction of rotation of the flange 75 is indicated by the arrow 91 in Fig. 11. It will be seen that rotation of the flange 75 in the direction of the arrow 91 tends to increase the grip of the cams 82 upon the rim 80, while pressure on the pin 88 in an opposite direction will release the cams 82 from their contact with the rim 80 and permit the flange 75 to revolve freely without communicating motion to the printing member 66 and the mechanism contained therein. The mechanism for controlling the movements of the printing member 66 will be hereinafter described.

A series of numbering-wheels 92 is journaled within the printing member 66 upon an axis disposed at right angles to the shaft 71. The numbering-wheels 92 vary in diameter, as indicated in Fig. 12, and are of such form that the part of their printing-surface which is farthest from the center of the printing member 66 is concentric with the axis of the printing member 66 and exactly conforms with the printing-surface 93 of the plate 94, which is secured to the periphery of the printing member 66. The numbering-wheels 92 are loosely mounted on a head 95, which is rigidly secured to the frame 96. The frame 96 is in turn secured to the lower head 69 of the printing member 66. As is usual in devices of this class, the numbering-wheels are operated by a reciprocating lever 97 and increase their count by unity for each reciprocation of said lever. Detailed description of the mechanism which operates the numbering-wheels 92 and which is shown in Figs. 12 and 13 will be herein omitted, since such devices are already in common use and commonly understood. The pawl 98 serves to advance the wheels 92, and the pawl 99 prevents the same from turning backward. The pawl 98 is pivoted on the levers 97 and 97' and is urged outward into contact with the wheels 92 by a spring. (Not shown in the drawings.)

A roller 100 is journaled at the end of the lever 97 and engages the cam 101, which is rigidly secured to the shaft 71 and which is provided with a cam-slot 102. The cam-slot 102 is of such form as to cause the lever 97 to reciprocate once during each revolution of the printing member 66 about the shaft 71. The cam 101 is secured to the shaft 71 by means of a set-screw 103. This permits the cam 101 to be adjusted with respect to the shaft 71, so that the numbering-wheels may be caused to increase their count at a particular interval of the revolution of the printing member 66— that is, the cam 101 is adjusted, so as to cause the numbering-wheels to change their count between the time of making an impression and the time of their arrival at the inking-roller, which will be hereinafter described.

The two wheels 104 and 105, which print the highest figures of the number printed by the numbering-weeels 92, are each provided with ten stop-holes 106. The stop-holes 106 are exactly spaced, and each corresponds to one of the numbers on the periphery of its respective numbering-wheel. The holes 106 are screw-threaded, and nine of same are filled with flush-headed screws 120. The tenth hole is left open for the purpose of engaging the locking-pin 107, which is normally urged toward said holes and which will be hereinafter described. Each of the numbering-wheels 92 is separated from its neighbor by a washer 108, which is provided with a projecting shoulder 109, fitting a notch in the head 95, thus preventing movement of the washer 108 and preventing the motion of one of the numbering-wheels 92 from being communicated to its neighbor by friction. A recess 110 is cut into each of the washers to prevent the same from interfering with the operation of the pawl 98.

The washer 111, which separates the numbering-wheel 105 from the adjacent part of the frame 96, is of special construction and serves as a sixth wheel in the series of numbering-wheels, of which five are shown. The washer 111 is provided with a shoulder 112, similar to the shoulder 109 of the washer 108; but the head 95 is at this point provided with a groove 113 of sufficient length to permit the washer 111 to advance one-tenth of a revolution. The washer 111 is provided with a shoulder 114, corresponding to that of one of the notches 115 of the numbering-wheels 92 and adapted to engage the pawl 98 when the same is in the deep notch 116 of the fifth numbering-wheel—that is, the wheel 105 next preceding the washer 111. The notch 117 of the washer 111 is of sufficient length beyond the shoulder 114 to prevent further engagement between the pawl 98 and the washer 111 after said washer has been moved by said pawl through one-tenth of a circle, as indicated by dotted lines in Fig. 15. The washer 111 is provided with a hole 118, which corresponds in location to the stop-hole marked 1 in Fig. 13. The washer 108 between the fourth and fifth numbering-wheel is provided with a hole 119, which corresponds in location to the hole marked 0 in Fig. 13.

Each of the holes 106 corresponds to one of the numbers on the periphery of its respective numbering-wheel, and each of said holes is marked with the number to which it corresponds, as indicated in Fig. 13. The pin 107 is mounted in the frame 96 in suitable position to be in exact alinement with one of the holes 106 when the number on the periphery of the numbering-wheel 104 or 105 which corresponds to said hole is in its printing position. In the device shown the pin 107 is in alinement with the hole marked 0 and 121 in Fig. 13. The hole 121, which is the 0 hole in the wheel 105, is somewhat larger in diameter than the other stop-holes in the wheels 104 and 105 in order that the screws 120 may be readily removed through the hole 121. A magnetized screw-driver is used for this purpose.

A lever 123 is fulcrumed at 124 to the head 69 of the printing member and has pivoted at one end a swivel 122, into which the pin 107 is screwed. The opposite end of the lever 123 is provided with a downwardly-projecting pin 125. The lever 123 is encircled by the spiral spring 126, which bears upon the numbering-wheel frame 96 and normally urges the pin 107 toward the numbering-wheels. The swivel 122 is seated in a slot near the end of the lever 123 to allow the necessary play when the lever turns.

The threaded part 157 of the pin 107 is sufficiently long to allow said pin to be moved through the swivel 122 a distance equal to the thickness of the wheel 105. The head 158 of the pin 107 and the small pin 159 serve as stops for limiting the adjustment of the pin 107.

A second lever 127 is fulcrumed concentrically with the shaft 71 and is held in the position shown in Fig. 10 through the engagement of the pin 125 with the shoulder 128 of the lever 127. The lever 127 is provided with the spring 129, which normally tends to draw the arm 130 into contact with the pin 88, and thus release the cams 82 from engagement with the rim 80 of the flange 75.

A locking-pin 131 is seated in the casing 132 and urged, by means of the spring 133, toward the shaft 71, which is provided with the recess 134, adapted to receive the pin 131 and prevent further rotation of the printing member 66.

An arm 135 is secured to the pin 131 and projects through a slot 136 in the top of the casing 132. The detent 137, forming a part of the lever 127, engages the arm 135 and is adapted to hold the pin 131 out of engagement with the shaft 71 until the lever 127 has turned enough to force the pin 88 backward and release the cams 82 from contact with the flange 75. As soon as the lever 127 has turned sufficiently to move the detent 137 out of engagement with the arm 135 the spring 133 will be free to force the pin 131 into the aperture 134 and lock the printing member 66 against further revolution with respect to shaft 71.

The apertures 138 and 139 in the shell 70 are provided to permit access to the interior of said shell for the purpose of setting or adjusting the mechanism therein. A ratchet 142 is rigidly secured to the shaft 71 within the shell 70, and a pawl 143 is pivoted on the head 68 and normally urged against the ratchet 142 by the spring 149. This pawl and ratchet are suitably arranged to prevent the member 66 from being turned in a direction opposite to the arrow 91.

A type-wheel 140 is journaled on a vertical axis above the numbering-wheels 92 and projects through an aperture near the upper part of the shell 70. The type-wheel 140 is provided with three printing-surfaces 141, 141', and 141", each of which has the same curvature as the plate 94 and each of which is adapted to be brought into suitable position to coincide with the printing-surface of said plate by the turning of the wheel at 140. The type-wheel 140 is rigidly secured to a shaft 144, which extends upward through the head 68 of the printing member 66. The shaft 144 has secured thereto above the head 68 a triangular member 145, a pinion 146, and a disk 147. The three faces of the member 145 make an angle of sixty degrees with each other and are disposed with respect to the printing-surfaces of the type-wheel 140 in the relative positions indicated in Fig. 9. The disk 147 is provided with three upwardly-projecting pins 148, 148', and 148" of the type-wheel 140. The arm 151 is pivoted to the head 68 at 152 and is held, by means of the spring 153, into engagement with the member 145. The arm 151 is adapted to fit one of the three sides of the member 145, and thereby hold one of the printing-surfaces of the type-wheel in coincidence with the printing-surface of the plate 94. The pinion 146 meshes with the gear 154, which is loosely journaled on the shaft 71. The gear 154 is made double, as shown in Figs. 3 and 8, and is also in mesh with the pinion 155, which is secured to a shaft 166, journaled on the bracket 67.

A circular dial-plate 167 is rigidly secured to the bracket 67 in axial alinement with the shaft 166. A second shaft 168 is journaled in the dial-plate 167 in alinement with the shaft 166. The opposed ends of the shafts 166 and 168 are each provided with a clutch member 169 and 170, respectively. The clutch members 169 and 170 are normally held out of engagement with each other by the spring 171, which is located within the clutch member 169 and between the shafts 166 and 168, as shown in Fig. 3. The lower part of the dial-plate 167 is provided with three notches 172. These notches are located one hundred and twenty degrees apart and each corresponds with one of the printing-surfaces 141 on the type-wheel 140. The shaft 168 has projecting therefrom a pin 173, which is adapted to fit said notches 172. The upper end of the shaft 168 is provided with a milled head 174. An indicator or pointer 175 is provided with a tongue 176, which fits a keyway in the shaft 168 and causes the indicator 175 to turn with the shaft 168, while permitting movement longitudinally of said shaft. The dial-plate 167 is surrounded by a casing 177 and is covered by the glass plate 178. The dial-plate 167 is suitably marked to indicate the positions of the indicator 175 which correspond to the different positions of the type-wheel 140. The pinions 146 and 155 are of exactly the same diameters and are each in mesh with one of the parts of the gear 154, and since the said parts of the gear 154 have the same diameter the angular movement of the type-wheel 140 will be exactly the same as that of the pinion 155. The notches 172 prevent the indicator from being turned except when the head 174 is pushed downward until the clutch members 169 and 170 are in engagement with each other.

The arrangement of the various parts of the printing member 66 is particularly adapted for printing a stamp of the form shown in Fig. 16. The main part 179 of the stamp is printed by the plate 94. The large numbers 180 are printed by the numbering-wheels 92, and the portion 181, which is included between the lines X X and Y Y, is printed by one of the faces of the type-wheel 140. The portion 181 indicates the denomination of the stamp and is changeable through the turning of the type-wheel 140, each of the printing-surfaces of which is adapted to print a different denomination. For instance, the surface 141 may be engraved to print a one-cent denomination, the surface 142 may print a two-cent denomination, and the surface 143 a five-cent denomination. The license-number, which appears in the lower part of Fig. 16, is printed by the plate 94, and its function is to identify the user of the machine.

The mechanism which controls the operation of the printing-roller is constructed as follows: An arm 182 is rigidly secured to a shaft 183, which is disposed vertically and is journaled on the bracket 184, which is secured to the bed-plate 2. The arm 182 is revoluble in a horizontal plane and is adapted to enter the space between the head 69 of the printing member 66 and the flange 75. The end 185 of the arm 182 is adapted to engage the pin 88 and through the action of the lever 86 move the cams 82 out of engagement with the flange 75 and prevent the revolution of the member 66. To reduce the friction between the pin 88 and the arm 182, a star-shaped roller 186 is pivoted at 187 to said arm. The star 186 is prevented from rotating through contact of two of its points with the surfaces of the drum 81 when the arm 182 is in its innermost position. As soon as the arm 182 swings away from the drum 81 the star 186 will revolve and quickly release the pin 88, and springs 84 will instantly throw the cams 82 into engagement with the flange 75, and the printing member 66 will revolve with the flange 75.

In order to insure that the printing-roller 66 will be stopped after each revolution regardless of the position of the arm 182, a second arm 188 is provided. The arm 188 is pivoted to the bed-plate 2 at 189 and is connected with the arm 182 by means of a lever 190, which enters a slot 191 and is connected to the arm 182 by the pin 192. The pin 192 is seated in a slot 193 to permit of the necessary movement of the arm 182 and the lever 190. By this arrangement the end 194 of the arm 188 will move into position to engage the pin 88 when the arm 182 moves out of such position, and vice versa. The movements of the arm 182 in the direction of the arrow 195 is controlled by a finger 196, which projects through a slot in the wall 31 in suitable manner to engage the advancing edge of the envelop or other mail-matter which is passed through the machine. The finger 196 is pivoted at 197 to an arm 198, which is secured to the vertical shaft 199 and which is adjustably secured to said shaft by means of a set-screw 200. The shaft 199 is rigidly secured to the bed-plate 2 and to the bracket 184. In order that the finger 196 will engage the mail-matter at a considerable distance above its lower edge, the finger 196 is disposed a considerable distance above the plane of the arm 182. A second arm 201 is secured to the shaft 183 by means of a set-screw 202 and is connected with the finger 196 by the link 203. The link 203 is pivoted to the finger 196 at 204 and enters a slot 205 in the arm 201, where the shoulder 206 of the link 203 is held into engagement with the pin 207 of the arm 201 by means of a spring 208. A spiral spring 209, encircling the shaft 183, normally urges the arm 182 toward the drum 81 of the printing-roller 35. On the lower side of the link 203 is a projecting lug 210.

One of the surfaces of the lug is beveled, as at 211, and is adapted to engage a stop 212 on the bracket 213, which is secured to the bed-plate 2. The stop 212 is preferably a set-screw threaded into a lug 214 on the bracket 213. The stop 212 is thus adjustable longitudinally of the link 203.

The relative lengths of the arms 182 and 201 and the finger 196 are such that when the finger is moved by a piece of mail-matter the arm 182 will be moved out of engagement with the pin 88 and will release the pin 88 before the finger 196 has been pushed to a position flush with the wall 31. The set-screw 212 is so adjusted that it will engage the end 211 of the lug on the link 203 as soon as the arm 182 is moved sufficiently to release the pin 88. A continued movement of the finger 196 will cause the surface 211 to slide along the pin 212 and wedge the link 203 against the spring 208, and thereby release the shoulder 206 from the pin 207. The spring 209 now forces the arm 182 back against the drum 81 and into position for again engaging the pin 88. In case the printing-roller 35 should have nearly completed one revolution before the arm 182 is returned to contact with the arm 81 said printing-roller would have been stopped by the arm 188, since the arm 188 is always in position for engaging the pin 88 when the arm 182 is moved out of such position. The finger 196 is normally held in the position shown in Fig. 6 by the action of the spring 215. The spring 215 is mounted on the member 216, which is adjustably secured to the shaft 199 by means of a set-screw 217. The end 218 of the wall 31 is secured to the shaft 199 by means of the brackets 219.

The ink-roller 220 is journaled in vertical bearings 221 in the forked swinging arm 222. The arm 222 is journaled on a fixed shaft 223, which is secured to the bracket 213 and to the bed-plate 2. The ink-roller 220 is provided at its lower end with a projecting annular flange 224. The ink-roller is normally urged toward the printing-roller by means of a spring 225, which is adjustable on the shaft 223 and which bears against the shaft 226 of the ink-roller. The flange 224 is adapted to roll on the periphery 227 of the head 69 of the printing member. The periphery 227 is of suitable form to permit the ink-roller 220 to come into contact with the printing-surface of the roller 66, as is indicated by dotted lines 228 in Fig. 10. This permits the ink-roller 220 to ink up the stamp on the printing member 66, but prevents it from coming into contact with the other parts of the member 66. The ink-roller 220 is of the fountain type, being filled with ink through its hollow shaft 226. The upper end of shaft 226 projects through the top of the casing 12 and is closed by the milled cap 229.

The platen-roller 36, which coacts with the printing-roller 35, is journaled in vertical bearings 230 and 231 in the forked arm 232. The platen-roller 36 is covered with a thick layer 233, of rubber or similar yielding material. The shaft 234 of the platen-roller 36 is provided with two universal joints 64 to permit the platen-roller 36 to swing upon the arm 232 during the passage of mail of varying thicknesses.

The idler 235 is journaled on the arm 72 of the bracket 67 and coacts with the platen-roller 36, thus causing the platen-roller to serve as a feed-roller when the printing-roller 35 is stopped and not in engagement with the platen-roller.

The feed-roller 44 is secured to the shaft 236, which is journaled in the vertical bearings in the bed-plates 1 and 2 and in the bracket 213. The shaft 236 is provided with a separable joint 65 near the bed-plate 2. The parts of the shaft 236 are supported by collars 237, which bear upon the bed-plates 1 and 2, respectively. The feed-roller 43 is secured to the shaft 238, which is journaled in the swinging arm 239. The shaft 238 is provided with two universal joints 64 to permit of the required lateral movement. The arms 232 and 239 are journaled on the vertical fixed shaft 240, to which is also journaled the forked arm 241, which carries the delivery-roller 45. The arms 232, 239, and 241 are normally urged toward the center line of the machine by means of the springs 242, which bear against said arms and are adjustably secured to the fixed vertical shaft 243.

The feed-rollers 41 and 42 are journaled on the swinging arms 244 and 245, which are normally urged toward each other by the springs 242 and 246. The fixed rollers 41 and 42 are respectively driven by the shafts 247 and 248, which are also provided with universal joints 64. The bed-plate 2 is provided with suitable slots 249 where each of the jointed shafts passes through same.

The feed-roller 39 is loosely journaled on the shaft 250, which is journaled in fixed bearings in the bed-plate 1 and the supporting-frame 251 of the platform 14. A ratchet 252 is rigidly secured to the shaft 250 above the roller 39 and engages a pawl 253, which is pivoted to the top of the roller 39 and held in engagement with the ratchet 252 by means of a spring 254. The feed-roller 40 is mounted similarly to the feed-roller 39, except that the shaft 255 of the feed-roller 40 is journaled in the swinging arm 256 and provided with universal joints 64.

Both of the feed-rollers 38 and 37 are journaled in fixed bearings and are respectively driven by the shafts 257 and 258. The separator-roller 49 is journaled on the arm 259 and is driven by the flexible shaft 260. Both the arms 259 and 256 are journaled on the fixed shaft 261. The roller 40 is urged toward the center line of the machine by means of the spring 262, and the separator-roller 49 is urged toward the center line of the machine by means of the spring 30. The spring 30 is secured to the fixed post 261 and may be clamped by the set-screw 263, so that the free end of said spring will bear toward the feed-roller 38. The spring 30 is connected with the arm 259, which carries the roller 49 by means of the threaded bolt 266. By means of the nut 265 the bite of the separator-roller 49 is adjusted—that is, the amount of surface of the separator-roller which projects beyond the spring 30 may be increased or diminished by turning the nut 265. The tension of the spring 30 is regulated by adjusting the same on the shaft 261 by means of the set-screw 263. Similarly, the tension of the spring 262 is regulated by adjustment on the shaft 264.

The spring 30 is provided with apertures to permit the rollers 40 and 49 to protrude through same, as seen in Figs. 1 and 2. Relative adjustment between the spring 30 and the separator-roller 49 is accomplished by moving the milled nut 265 along the bolt 266. The bolt 266 is hinged at to 267 to the spring 30 and passes through a hole in the lug 268 on the arm 259. The spring 30 serves the double purposes of urging the separator-roller toward the feed-roller 38 and of forming a continuation of the walls 28 and 29 and guiding the mail-matter to the slot 24 in the casing 12. A screw 343, screwed into the post 344 and provided with a milled head 345, serves as a stop for limiting the movement of the arm 259 and its connections toward the center line of the machine.

The roller 47 is secured to the shaft 269, which is journaled in fixed bearings in the bed-plate 2 and the bracket 156 and is provided with a separable joint 65. The roller 45 is mounted on the shaft 270, which is provided with universal joints and journaled in the movable arm 241. The stacker 48 is mounted on the shaft 271, which is journaled in fixed bearings in the bed-plate 1 and in the supporting-arm 272 of the platform 20.

The movable plate 34 is secured to a frame 273, which is slidably mounted on a pair of parallel rods 274, forming part of the supporting-frame of the platform 20. The platform 20 is provided with slots 275, which permit of movement of the plate 34 along the platform 20. The plate 276 serves to stop the forward movements of envelops delivered upon platform 20.

The registering mechanism in the device shown consists of four registers 281, inclosed in a casing 277, which is mounted on the bracket 184 within the casing 12. Of the registers three are for the purpose of registering the number of stamps of each denomination which are printed and the fourth registers the total number of impressions made by the printing-roller. The casing 277 may be provided with independent locking means for the purpose of being made inaccessible even to one who has access to the mechanism in the casing 12. The registers are operated by the systems of gearing 278, which receive their motion from the rotation of the register-stars 279, which are suitably located to engage the pins 148 on the disk 147 during the revolution of the printing member 66. The pins 148, as seen in Fig. 9, are located one hundred and twenty degrees apart and each at a different distance from the center of the shaft 144. Each of the pins 148 corresponds to one of the printing-surfaces of the type-wheel 140. Each of the three register-stars is located in suitable position to be engaged by its respective pin 148 when the printing-surface of the type-wheel 140 which corresponds to such pin is in its printing position. It will thus be seen that only one of the register-stars will be operated at a time. The register-stars are each mounted upon an independent shaft, the shaft 280 corresponding to the star 279 and the shafts 280' and 280'' corresponding to the register-stars indicated by similar accent-marks in Figs. 17 and 18. Each of the shafts 280 is connected by an independent train of gears (indicated by dotted lines in Fig. 4) to its respective registering device 281. The registering device 281''', which records the total number of impressions, is suitably geared to increase its count whenever the count of one of the other registers is increased. The gears 283, which are the last in the trains which connect the register 281''' with each of the register-stars 279, are connected to the register-shaft 284 by pawls and ratchets, as indicated in Figs. 24 and 25, so that either of the register-stars may operate the register 281''' independently of the other registers. Each of the ratchets 285 is rigidly secured to the shaft 284 by means of a pin 286, which extends though the shaft 284 and engages suitable recesses in the ratchet 285. Each of the gears 283 is loosely mounted on the shaft 284 and has pivoted thereon a pawl 287, which is held in engagement with its respective ratchet 285 by a spring 288. Movement of the gears 283 and the ratchets 285 longitudinally of the shaft 284 is prevented by the casing 277 and the plate 277', which also serve as supporting-frame for said gears. Of the remaining gears of the trains 278 (represented by dotted lines in Fig. 4) it will be understood that there are one gear 160, in mesh with the gear 282, two gears 161, in mesh, respectively, with the gears 282' and 282'', three gears 162, in mesh with the gears 283, three gears 163, each in mesh with one of the gears 160 or 161 and one of the gears 162, three gears 164, and three gears 165, all loosely mounted on their shafts.

All of the driving-gearing is incased by the bed-plate 1, which is hollow. Power is applied at the crank 289, which is mounted on a horizontal shaft 290, journaled at 291 above the bed-plate 1. The shaft 290 is connected, by means of the bevel-gears 292, to the shaft 293 and thence through the gears 294 and 295 to the shaft 77. All of the remaining mechanism is driven from the shaft 77 by means of trains of gearing, which can be best understood from Fig. 5. The shafts 269 and 270, which carry the delivery-rollers 47 and 45, and the shaft 271, which carries the stacker 48, are driven by the shaft 77 through the direct train of gears 296, 297, 298, 299, 300, and 301, which mesh with each other in the order stated. Similarly, the platen-roller 36 and the feed-rollers 43, 44, 41, and 42 are driven by the gears 296, 302, 303, 304, 305, 306, 307, and 308. The gearing hereinbefore mentioned is suitably arranged and proportioned, so that the rollers driven by same will all move with the same peripheral speed as the printing member 66.

The feed-roller 39 is driven from the shaft 247 by the train of gears 309, 310, and 311. The feed-roller 40 and the separator-roller 49 are driven from the shaft 250 by the train of gears 312, 313, and 314. The feed-roller 38 is driven from the separator-roller shaft 260 by the train of gears 315, 316, and 317. The feed-roller 37 is driven from the shaft 257 of the feed-roller 38 by the train of gears 318, 319, and 320. The gears which drive the feed-rollers 39, 40, 38, and 37 are arranged and proportioned that the said feed-rollers will rotate at a slower peripheral speed than the printing-roller 35. It will also be seen from Fig. 5 that the separator-roller 49 will rotate in a direction opposite to the feed-roller 40. Since the gears 315 and 317 are of the same size, the shafts 260 and 257 will revolve at the same speed, and since the separator-roller 49 is of less diameter than the feed-roller 38 the peripheral speed of the roller 49 will be considerably less than that of the feed-roller 38.

The shuttle 321 consists of a rectangular card of stiff material of suitable form to pass through the machine in the same manner as an envelop. The card 321 is preferably inlaid with a layer of rubber 322 or similar yielding material located at the point upon which the printing member 66 will make an impression when the shuttle 321 is passed through the machine. The lower and forward edges of the card 321 are provided with a flange of thin metal 323, adapted to secure a sheet of paper or sticker 324 to the face of the card 321. A spring-clip 325, secured to the back of the card 321 and extending along its face, as indicated in Fig. 20, is provided to hold down the upper edge of the sticker 324. The spring 325 is preferably located on the card 321 in suitable position to engage the finger 196 during the passage of the card 321 through the feeding mechanism.

A post 326 is secured to the bed-plate 2 in a central position within the casing 12 and extends upward to a point near the top of the casing 12. As shown in Fig. 23, an aperture 327 extends through the top of the casing 12 at a point immediately above the post 326. A screw 328 is seated in the aperture 327 and extends into the screw-threaded aperture 329 in the upper end of the post 326. The casing 12 is provided with a suitable recess 330 for receiving the head 330' of the screw 328. The casing 12 is provided with a second recess 331, located above and considerably larger than the recess 330. The pins 332 are rigidly secured to the upper end of the post 326 and extend loosely through the apertures 333 and into the recess 331 at each side of the screw 328. The upper ends of the pins 332 are notched, as at 334. The head of the screw 330' is covered by a thin disk of sheet metal 335, and the entire recess 331 is closed by the cover 336, which is hinged at 337, and may be locked in a closed position by means of a padlock 338 on the staple 339.

In order that the advancing edge of an envelop passing between the feed-rollers 43 and 44 will be sufficiently stiff to move the finger 196, a broad spring 340 (see Figs. 1 and 4) is provided to hold said advancing edge into close contact with the wall 31 above the feed-roller 43 and in the vicinity of the finger 196. The spring 340 is provided with a slot 341 of just sufficient size to receive the finger 196. The spring 340 is adjustably secured to the shaft 240. The tension of the spring 340 is adjusted by shifting said spring around the shaft 240 and securing same by the set-screw 342.

The operation of the device shown is as follows: A plurality of envelops are placed on edge in the trough 14' and are pushed forward into contact with the inclined wall 29. The arm 59 swings backward through the slot 63, but bears against the last of the envelops in the trough 14' and presses said envelops toward the wall 27. The crank 289 is now rotated in a right-handed direction. This causes all of the rollers to rotate in the directions indicated by the arrows on said rollers—that is, in a drection tending to carry the letters from the trough 14' to the stacking-platform 20. The space 346 between the feed-roller 38 and the separator-roller 49 is regulated by means of the screw 343 to permit the passage of a single envelop. As seen by the arrow on the separator-roller 49, the friction of said roller would move a second envelop back in case two or more envelops tend to enter the space 346. Since the feed-roller 38 moves at a greater peripheral speed than the separator-roller 49, a single envelop will not be forced backward by the separator-roller 49. Further adjustment of the contact of the separator-roller 49 with envelops passing same is accomplished by adjusting the roller 49 to the spring 30 by means of the adjusting-nut 265. An envelop is advanced along the platform 14 at a speed equal to that of the peripheries of the feed-rollers 39 and 40; but as soon as the advancing edge of the letter is gripped by the feed-rollers 41 and 42 the letter will proceed at the peripheral speed of the printing-roller 35, which is greater than that of the feed-roller 39. The ratchet mechanisms on the feed-rollers 39 and 40 permit of this increase of speed by allowing the rollers 39 and 40 to slip on their shafts. This increase of speed insures a considerable separation between the rear and forward edges of two adjacent letters. When the letter arrives at the feed-rollers 43 and 44, the advancing edge of said letter will be held between the rollers 43 and 44 and between the spring 340 and the wall 31 in suitable manner to stiffen said advancing edge sufficiently to push the finger 196 out of the way and permit the advance of the letter to the printing-roller 35. As soon as the finger 196 is pushed back the trip mechanism, which will be hereinafter described, releases the printing member 66, which immediately commences to revolve and print a stamp in proper position upon the letter. The letter is then seized by the delivery-rollers 45 and 47 and pushed out of the casing 12 and along the platform 20, where it is forced by the stacker 48 against the inclined plate 34. The stacker 48 is rapidly revolving and is of such form that it will not stop the advance of the letter. The wall 276 prevents the letters from passing off of the platform 20. The surface of the delivery-roller 47 is offset at 347 to prevent its contact with the stamp which has been freshly printed upon the envelop. The plate 3 is moved along the platform 20 by the letters which accumulate between the plate 34 and the stacker 48. When the finger 196 is moved back through the advance of a letter between the rollers 43 and 44, the link 203, together with the arm 201 and the shaft 183, moves the arm 182 in the direction of the arrow 195 and out of engagement with the pin 88. As soon as the pin 88 is released the cams 82 are forced into contact with the flange 75 by means of the spring 84, and the printing member 66 immediately commences to revolve. As has been hereinbefore explained, a partial movement of the finger 196 is sufficient to move the arm 182 out of engagement with the pin 88. A continued movement of the finger 196 causes the surface 211 to engage the stop 212 and force the link 203 against the spring 208 sufficiently to release the shoulder 206 from the pin 207, whereupon the spring 209 immediately forces the arm 182 into contact with the drum 81 and into position for engaging the pin 88 and stopping the movement of the printing member 66. This tripping of the arm 182 occurs before the printing member 66 has had time to complete a revolution, so that the arm 182 prevents the printing member 66 from making more than one impression upon a single piece of mail-matter. The second arm 188, which has been previously described as being always in position for engaging the pin 88 when the arm 182 is out of such position, is provided as a precaution against possible failure of the trip mechanism to act. The inking-roller 220 is constantly urged toward the printing-roller 35 by means of the spring 225. The surface 227, which engages the flange 224 of the inking-roller 220, is of suitable form to hold the inking-roller out of contact with the periphery of the printing member 66 except when the printing-surface of the member 66 and the inking-roller 220 are in opposition. The inking-roller 220 is suitably located to ink its printing member 66 immediately before its printing-surface arrives at a suitable position to print upon a passing envelop, thus insuring the fresh inking of said printing-surface before each impression. As the printing-roller 66 revolves, the lever 97, moving in the cam-slot 102, causes the numbering-wheels 92 to increase their count by unity during each revolution. The cam 101 is suitably adjusted on the shaft 71, so that this increase in the count of the numbering-wheels 92 will take place during the interval of the revolution which occurs between the time of making an impression and the arrival of the numbering-wheels into position to be inked by the inking-roller 220.

The operation of the automatic stopping and locking mechanism is as follows: Each of the numbering-wheels 104 and 105 is provided with stop-holes 106, so that the machine may be automatically stopped when any of the numbers on either of said wheels arrive at its printing position. This result is accomplished by removing the screw 120 which corresponds to such number. For the purpose of reaching into the holes of either of the wheels 104 and 105 the locking-pin 107 is made adjustable to the lengths required. If it is desired to automatically stop the machine at one of the numbers on wheel 104, the pin 107 is adjusted to its longest length and is seated in the hole 121 of the wheel 105, as indicated by the dotted lines in Fig. 12. The pin 107 will now be urged by the spring 126 into the open hole in the wheel 104 when the number which corresponds to such open hole arrives at its printing position. If it is desired to stop the machine at one of the numbers on the wheel 105, the pin 107 is adjusted to its shorter length and the screw 120 corresponding to the desired number is removed from the corresponding hole 106 in the wheel 105. Thus if it be desired to automatically lock the machine when the numbering-wheels indicate "50,000," then the screw 120 (indicated by the small numeral 5 in the wheel 105) is removed from its corresponding aperture 106. The pin 107 will now fall into the hole 106, which is left open by the removal of said screw when the number 5 on the periphery of the wheel 105 arrives in its printing position. If it be desired to automatically lock the machine at the number "100,000," which is the highest number for which the device shown may be set, then all of the holes 106 of the wheel 105 are closed by screws 120, except the hole 121, and the washer 111 is set with its aperture 118 in the position shown by the full lines in Fig. 15—that is, opposite the hole marked "1" in Fig. 13. The pin 107 will thus be prevented from entering the hole 121 until after the wheel 105 has made a complete revolution. When the hole 121 again arrives at a position in alinement with the pin 107, the washer 111 will have been moved by engagement of the pawl 98 with the shoulder 114 into such position that the hole 118 will assume the position 118' and permit the pin 107 to fall through same into the hole 121. When the pin 107 is forced by the spring 126 into one of the stop-holes of the numbering-wheels, the pin 125 on the lever 123 will release the lug 128 on the lever 127. The spring 129 will now throw the arm 130 into contact with the pin 88, and thereby release the cams 82 from engagement with the clutch-flange 75 and will simultaneously move the arm 137 away from the detent 135 and permit the spring 133 to force the pin 131 into the aperture 134 of the shaft 71, thus locking the printing member 66 against further revolution.

To change the denomination of the stamp, the head 174 (see Fig. 3) is pushed down until the clutch members 169 and 170 are in contact with each other. This movement will cause the pin 173 to move out of the notch 172 and permit the free rotation of the shaft 168. The head 174 is now turned until the pointer 175 indicates the desired denomination of stamp. If the head 174 is now released, the spring 169 forces the clutch members apart and forces the pin 173 into one of the notches 172. It will be seen that the shaft 168 cannot be turned except when the clutch members 169 and 170 are in engagement with each other. When the shaft 168 is turned, the system of gears 155, 154, and 146 causes the type-wheel 140 to be correspondently moved, and when one of the printing-surfaces 141 is moved into printing position the corresponding pin 148 simultaneously moves into suitable position to engage the register-star, which corresponds to the said surface 141. The spring-arm 151 prevents the type-wheel 140 from turning when the clutch members 169 and 170 are out of engagement with each other. The gears 154 and 155 being loosely journaled offer no resistance to the turning of the printing member 66 when the clutch members 169 and 170 are out of engagement. When the printing member 66 is now revolved, the pin 148 will engage its respective register-star and cause same to rotate one-fifth of a circle and increase the count of the corresponding register 281 by unity. The register 281''', which indicates the totals, will also increase its count, as has been hereinbefore described.

Since the device shown is arranged to print a stamp on the lower corner of an envelop near its advancing edge, it will be seen that in order that the stamp shall appear on the upper left-hand corner of said envelop the envelop must be fed to the machine upside down, and since the sealing mechanism is arranged to seal a flap at the upper side of an envelop passing through the machine envelops which are to be sealed by the device must be open along their lower side instead of along the top side, as has been usual heretofore. Envelops of this kind may be placed in the trough 14' with their flaps open and extending over the wall 27. The feeding mechanism causes the envelops to pass singly into the machine, as before. When an envelop arrives at the twisted plate 52, said plate will cause the flap of the envelop to assume a horizontal position and pass between the roller 50 and plate 54. Since the roller 50 dips into the water in the receptacle 51, sufficient moisture will be applied thereby to the envelop for the purpose of sealing same. The plates 54 and 53 are suitably twisted to cause the flap of the envelop to be again turned back, and the sealing is completed by the pressure of the rollers 41 and 42. To adjust the sealing mechanism for various widths of envelops, it is only necessary to loosen the screw 57, whereupon the receptacle 51, together with the plates 52, 53, and 54, may be moved to the proper elevation.

Access to the interior of the casing 12 by the user is prevented by the locking means shown in Fig. 23. The casing 12 is placed in proper position with its lower edges in contact with the bed-plate 2 and the pins 332 projecting upward through the apertures 333. The screw 328 is tightly screwed into the post 326. This draws the casing 12 into tight contact with the bed-plate 2. The disk 335 is placed over the aperture 330 and a wire is stretched across above the disk 335, being twisted into the notches 334 in the pins 332. A suitable seal of easily-fusible material is now run over the top of the disk 335 and impressed with a suitable die. The cover 336 is now closed and secured in a closed position by the lock 338. It will thus be seen that it will be impossible to gain access to the interior of the casing 12 without picking the lock 338 and breaking the seal over the disk 335.

The operation of other parts of the device will be apparent from the construction of such parts which have been hereinbefore described.

It will be seen that numerous details of the construction shown may be altered without departing from the spirit of my invention. I therefore do not confine myself to such details, except as hereinafter limited in the claims.

What I claim as my invention, and desire to secure by Letters Patent, is—

1. The combination of a frame; a shaft secured to said frame; a member journaled on said shaft, and having a cylindrical printing-surface concentric with said shaft; a series of numbering-wheels mounted on said member on an axis transverse to said shaft, said wheels being provided with printing-surfaces and being of such form that their printing-surfaces conform with that of said member; suitable means for rotating said member on its shaft; mechanism operated by the rotation of said member and adapted to increase the count of said numbering-wheels during a certain portion of each revolution of said printing member, substantially as described.

2. The combination of a frame; a shaft secured to said frame; a member journaled concentrically with said shaft; a series of numbering-wheels mounted on said member on an axis transverse to that of said shaft; a lever mounted on said member and having connected thereto suitable mechanism for operating said numbering-wheels; a cam secured to said frame and adapted to engage said lever and cause same to reciprocate during the revolution of said member about said shaft, thereby operating said numbering-wheels.

3. The combination of a frame; a shaft secured to said frame; a member journaled concentrically with said shaft; a series of numbering-wheels mounted on said member on an axis transverse to that of said shaft; a lever mounted on said member and having connected thereto suitable mechanism for operating said numbering-wheels; a cam adjustably secured to said frame and adapted to engage said lever and cause same to reciprocate during the revolution of said member about said shaft, thereby operating said numbering-wheels.

4. The combination of a frame; a shaft secured to said frame; a member journaled concentrically with said shaft; a series of numbering-wheels mounted on said member on an axis transverse to that of said shaft; a lever mounted on said member and having connected thereto suitable mechanism for operating said numbering-wheels; a cam secured to said shaft and adapted to engage said lever and cause same to reciprocate during the revolution of said member about said shaft, thereby operating said numbering-wheels.

5. In a mail-marking machine, the combination of a frame; a rotary printing member journaled on an axis in said frame; a type-wheel journaled on said member on an independent axis and having on its periphery a plurality of printing-surfaces, each having the same curvature and each being adapted to be moved into or out of printing position by the turning of said wheel; means for turning said type-wheel to bring different surfaces into printing position; means for securing said type-wheel in different positions; a plurality of registering devices mounted in said frame and each corresponding to one of the printing-surfaces on said type-wheel; and suitable mechanism for causing each of said registers to count the number of impressions made by its respective printing-surface.

6. In a mail-marking machine, the combination of a frame; a printing-roller journaled in said frame and adapted to print a stamp; a series of numbering-wheels journaled in said roller and adapted to print a number in connection with said stamp; means for increasing the count of said numbering-wheels after each impression made by said printing-roller; and means for locking said printing-roller against further operation when a certain number of impressions have been made.

7. In a mail-marking machine, the combination of a frame; a printing-roller journaled in said frame and adapted to print a stamp; a series of numbering-wheels journaled in said roller and adapted to print a number in connection with said stamp; mechanism for feeding envelops singly and in succession to said printing-roller; means for operating said numbering-wheels at suitable intervals to increase their count and print a different serial number upon each envelop fed to said printing-roller; and means for locking said printing-roller against further operation when a certain number of impressions have been made and independently of the operation of said feeding mechanism.

8. The combination of a frame; a driving-shaft journaled in said frame; a member journaled concentrically with said shaft; a series of numbering-wheels mounted on said member and revoluble therewith; means for causing said numbering-wheels to increase their count during a certain interval of the revolution of said member; a clutch for connecting said member to said driving-shaft; means for normally urging said clutch into its engaged position; and suitable mechanism adapted to automatically release said clutch when said numbering-wheels indicate a certain number.

9. The combination of a frame; a printing-roller journaled in said frame; a series of numbering-wheels, journaled in said roller and adapted to successively number the impressions made by said printing-roller; and means for automatically locking said roller against further operation when said numbering-wheels indicate a certain number.

10. The combination of a frame; a printing-roller journaled in said frame; a series of numbering-wheels, journaled in said roller and adapted to successively number the impressions made by said printing-roller; means for locking said roller against further operation; a spring normally urging said locking means into locking position; a movable detent adapted to hold said locking means against said spring and out of locking position; suitable releasing mechanism for moving said detent out of engagement with said locking means, said releasing mechanism being adapted to operate when said numbering-wheels indicate a certain number.

11. The combination of a frame; a rotary printing member journaled in said frame; a type-wheel journaled on said member and having on its periphery a printing-surface, said wheel being adapted to be turned to bring said printing-surface into and out of printing position; means for changing the disposition of said type-wheel; and a dial secured to said frame and adapted to indicate the disposition of said type-wheel.

12. The combination of a frame; a rotary printing member journaled in said frame; a type-wheel journaled on said member and having on its periphery a printing-surface, said wheel being adapted to be turned to bring said printing-surface into and out of printing position; means for changing the disposition of said type-wheel; a dial secured to said frame and adapted to indicate the disposition of said type-wheel; and suitable means for preventing a change in the indication of said dial without correspondingly changing the disposition of the type-wheel.

13. The combination of a frame; a rotary printing member journaled in said frame; a type-wheel journaled on said member and having on its periphery a printing-surface, said wheel being adapted to be turned to bring said printing-surface into and out of printing position; a pinion journaled on the same axis with said type-wheel and secured thereto; a gear loosely journaled concentrically with said member and meshing with said pinion; a second pinion journaled in said frame independently of said member, and meshing with said gear, said pinions lying in different planes and being adapted to freely pass each other during the revolution of said member; a dial secured to said frame and having a revoluble indicator journaled concentrically with said second pinion; a clutch for connecting said indicator with said second pinion; means for normally holding said clutch in a disengaged position; and means for preventing the turning of said indicator, except while said clutch is in its engaged position.

14. In a mail-marking machine, the combination of an intermittently-operated printing-roller; suitable mechanism for feeding mail-matter to said printing-roller; a finger projecting across the path of the mail-matter fed to said printing-roller and adapted to control the operation of said printing-roller, said finger being adjustable toward and from said printing-roller for the purpose of regulating the location of an impression made by said roller upon said mail-matter.

15. In a mail-marking machine, the combination of a frame; an intermittently-moving printing-roller journaled in said frame and provided with a clutch of the class described; mechanism for feeding mail-matter to said printing-roller; an arm pivoted in said frame and adapted to engage said clutch and stop the revolution of said printing-roller; a finger projecting across the path of the mail-matter and adapted, when in engagement with the advancing edge of said mail-matter, to move said arm and cause same to release said clutch and permit said roller to rotate; and a second arm adapted to move into position for engaging said clutch when said first arm moves out of such position.

16. In a mail-marking machine, the combination of a frame; a revoluble member journaled in said frame and provided with a spring-actuated clutch of the class described; a pivoted arm adapted to engage said clutch and stop the rotation of said member; a finger movably mounted in said frame; a link connecting said arm with said finger and adapted to move said arm out of engagement with said clutch when said finger is moved a certain distance; a spring normally urging said arm into position for engaging said clutch; and means operated by the continued movement of said finger and adapted to disconnect said arm from said finger and permit said arm to return to engagement with said clutch independently of said finger.

17. In a mail-marking machine, the combination of a printing-roller provided with a clutch of the class described; the finger 196; the arm 182; the link 203, normally held in position to connect said finger with said arm by means of a spring 208; the beveled shoulder 211 on the link; the stop 212 adapted to engage said shoulder and trip said link, thereby disconnecting said arm from said finger, substantially as shown and described.

18. In a mail-marking machine, the combination of a printing-roller provided with a clutch of the class described; the finger 196; the arm 182; the link 203, normally held in position to connect said finger with said arm by means of a spring 208; the beveled shoulder 211 on the link; an adjustable stop adapted to engage said shoulder and trip said link, thereby disconnecting said arm from said finger, substantially as shown and described.

19. In a mail-marking machine, the combination of a frame; a printing-roller journaled in said frame and provided with a clutch of the class described; a finger movably mounted in said frame; an arm movably mounted in said frame and adapted to engage said clutch and stop the revolution of said printing-roller; a spring normally urging said arm into engagement with said clutch; suitable connection between said arm and finger whereby a certain movement of said finger will cause said arm to release said clutch; mechanism for tripping said connection and permitting said arm to return to engagement with said clutch, independently of said finger; and a second arm adapted to move into position for engaging said clutch when said first arm moves out of such position, substantially as described.

20. In a machine of the class described, the combination of a frame; a pair of shafts journaled in said frame and each having loosely journaled thereon a feed-roller; pawl-and-ratchet mechanism connecting said rollers to their respective shafts in such manner that said rollers may be driven by said shafts or may rotate faster than their shafts; a second pair of feed-rollers disposed in parallel relation to said first pair and geared to rotate faster than said first pair, substantially as described.

21. In a machine of the class described, the combination of a platform; a printing-roller journaled on a vertically-disposed axis and located above said platform; a pair of feed-rollers adapted to move mail-matter along said platform and toward said printing-roller, and geared to the same peripheral velocity as said printing-roller; a second pair of feed-rollers preceding said first pair and geared to rotate with a slower peripheral velocity than said first pair; and suitable pawl-and-ratchet mechanism adapted to permit said second pair of feed-rollers to increase their peripheral speed independently of their driving mechanism when engaging matter that is also engaged by said first pair.

22. The combination of a frame; a printing member journaled in said frame and adapted to make an impression when revolved on its axis; a printing-surface movably mounted in said member and adapted to be moved into and out of printing position; a register mounted in said frame; and suitable connection between said printing member and said register whereby said register will count the number of revolutions of said member when said printing-surface is in its printing position, but will be unaffected by the rotation of said member when said printing-surface is out of printing position.

23. In a machine of the class described, the combination of a frame; a printing member journaled in said frame, and adapted to print an impression when revolved on its axis; a plurality of printing-surfaces movably mounted on said printing member and each adapted to be moved into and out of printing position; a plurality of registers mounted in said frame and each corresponding to one of said printing-surfaces; and suitable mechanism connecting said member with said registers, whereby each of said registers will count the number of impressions made by its respective printing-surface.

24. In a machine of the class described, the combination of a frame; a printing member journaled in said frame, and adapted to print an impression when revolved on its axis; a plurality of printing-surfaces movably mounted on said printing member and each adapted to be moved into and out of printing position; a plurality of registers mounted in said frame and each corresponding to one of said printing-surfaces; a plurality of register-stars journaled on a common axis and each geared to one of said registers; a plate movably mounted on said member and having thereon a plurality of shoulders, each corresponding to one of said printing-surfaces; and means connecting said plate with said printing-surfaces in such manner that each of said shoulders will be moved to suitable position to engage its respective register-star, during the revolution of said member, when its respective printing-surface is moved to its printing position.

25. The combination of a frame; a series of counting-wheels mounted on a common axis and each having therein an annular series of holes; suitable movable means for closing said holes; a pin slidably mounted near said wheels and adapted to engage any of said holes, which is open when such hole is opposed to said pin; means normally urging said pin toward said wheels; and means for suitably adjusting said pin to bring same into suitable position for engaging the holes in any one of said wheels, substantially as and for the purpose specified.

26. The combination of a frame; a series of counting-wheels mounted on a common axis and each having in its side face an annular series of holes; suitable movable means for closing said holes; a pin slidably mounted near said wheels and adapted to engage any of said holes, which are open when such hole is opposed to said pin; means normally urging said pin toward said wheels; and means for adjusting the length of said pin to bring same into suitable position for engaging the holes in any one of said wheels, substantially as and for the purpose specified.

27. The combination of a frame; a counting-wheel journaled in said frame, and having in its side a hole; a second wheel journaled on a common axis with said counting-wheel, having a hole extending through same and adapted to be moved to bring said hole into or out of alinement with the hole in said counting-wheel; a pin slidably mounted near said wheels and in alinement with one of the positions of the hole in the counting-wheel; means normally urging said pin toward said holes; means for moving said second wheel to prevent said pin from entering the hole in said counting-wheel; and suitable mechanism for operating said counting-wheel and for moving the hole in said second wheel into alinement with said pin when the hole in the counting-wheel returns to a position of alinement with said pin, substantially as and for the purpose described.

28. In a mail-marking machine, the combination of a frame; a printing member journaled in said frame on a vertical axis; a moistening-roller journaled in said frame on a horizontal axis; suitable feeding mechanism adapted to receive envelops and carry same on edge singly and in succession to said moistening-roller and printing member; and suitable guides for causing the flaps of the envelops to pass in contact with said moistening-roller and for folding said flaps against the envelops, while said envelops are being fed to said printing mechanism.

29. The combination of a frame; a member rotatably mounted in said frame and having a cylindrical printing-surface; a series of numbering-wheels mounted on said member on an axis transverse to the axis of said member, and adapted to print a number when said member is rotated; suitable means for rotating said member on its axis; and mechanism operated by the rotation of said member and adapted to increase the count of said numbering-wheels, substantially as described.

30. The combination of a frame; a rotary printing member journaled in said frame; a type-wheel journaled on said member and having on its periphery a printing-surface, said wheel being adapted to be turned to bring said printing-surface into and out of printing position; means for changing the disposition of said type-wheel; a dial rigidly secured to said frame and having a movable pointer adapted to indicate the disposition of said type-wheel; mechanism connecting said pointer to said type-wheel and adapted to change the disposition of said type-wheel when the pointer is moved, substantially as described.

31. The combination of a frame; a rotary printing member journaled in said frame; a type-wheel journaled on said member and having on its periphery a printing-surface, said wheel being adapted to be turned to bring said printing-surface into and out of printing position; means for changing the disposition of said type-wheel; a dial rigidly secured to said frame and having a movable pointer adapted to indicate the disposition of said type-wheel; mechanism connecting said pointer with said type-wheel and adapted to change the disposition of said type-wheel when the pointer is moved, said pointer being normally disconnected from said printing member so as to permit the free rotation of said printing member on its axis, substantially as described.

32. The combination of a frame; a rotary printing member journaled in said frame; a type-wheel journaled on said member and having on its periphery a printing-surface, said wheel being adapted to be turned to bring said printing-surface into and out of printing position; means for changing the disposition of said type-wheel; a dial rigidly secured to said frame and having a movable pointer adapted to indicate the disposition of said type-wheel; mechanism connecting said pointer with said type-wheel and adapted to change the disposition of said type-wheel when the pointer is moved, said mechanism being adapted to operate when said printing member is secured against rotation and independently of the angular position of said printing member on its axis, substantially as described.

33. The combination of a frame; a rotary printing member journaled in said frame; a type member movably mounted on said printing member and having thereon a printing-surface; said type member being adapted to be moved so as to bring said printing-surface into and out of printing position; means for changing the disposition of said type member; a dial secured to said frame and adapted to indicate the disposition of said type member; suitable means for preventing a change in the indication of said dial without correspondingly changing the disposition of said type member, substantially as described.

34. The combination of a frame; a counting-wheel journaled in said frame; a second wheel loosely mounted in axial alinement with said counting-wheel and having therein an aperture; said second wheel being free to rotate independently of said counting-wheel; mechanism for rotating said counting-wheel, adapted to simultaneously rotate said second wheel; a pin slidably mounted in said frame and normally urged against said second wheel and adapted to engage said aperture, substantially as and for the purpose specified.

35. The combination of a frame; a counting-wheel journaled in said frame; a second wheel loosely mounted in axial alinement with said counting-wheel, and free to rotate independently of said counting-wheel; mechanism adapted to simultaneously rotate both of said wheels; a stop on said second wheel; and a locking device adapted to be operated by said stop when said second wheel is turned to a certain position, substantially as described.

Signed at Chicago this 6th day of August, 1902.

ARTHUR H. PITNEY.

Witnesses:
 EUGENE A. RUMMLER,
 RUDOW RUMMLER.